United States Patent [19]
Seong et al.

[11] Patent Number: 5,818,707
[45] Date of Patent: Oct. 6, 1998

[54] SIMPLIFIED ACTIVE POWER FACTOR CORRECTION CONTROLLER IC

[75] Inventors: Hwan-Ho Seong; Su-Gyeong Kim, both of Seoul, Rep. of Korea

[73] Assignee: Samsung Electronic, Co., Ltd., Suwon, Rep. of Korea

[21] Appl. No.: 751,518

[22] Filed: Nov. 15, 1996

[30] Foreign Application Priority Data

Nov. 16, 1995 [KR] Rep. of Korea .................. 95-41682

[51] Int. Cl.$^6$ ................................................. G05F 1/70
[52] U.S. Cl. ......................... 363/89; 323/210; 323/222; 323/285
[58] Field of Search ................................. 323/210, 211, 323/222, 282, 283, 284, 285; 363/890

[56] References Cited

U.S. PATENT DOCUMENTS

| | | | |
|---|---|---|---|
| 4,683,529 | 7/1987 | Bucher | 323/222 |
| 5,006,975 | 4/1991 | Neufeld | 363/89 |
| 5,028,861 | 7/1991 | Pace et al. | 323/285 |
| 5,134,355 | 7/1992 | Hastings | 323/211 |
| 5,367,247 | 11/1994 | Blocher et al. | 323/284 |
| 5,467,010 | 11/1995 | Quarmby et al. | 323/222 |
| 5,508,602 | 4/1996 | Borgato et al. | 323/222 |
| 5,644,214 | 7/1997 | Lee | 323/211 |

*Primary Examiner*—Jeffrey L. Sterrett
*Attorney, Agent, or Firm*—Marger, Johnson, McCollom, & Stolowitz, P.C.

[57] ABSTRACT

Disclosed is an active power factor correction integrated circuit for a boost converter, comprising a bias voltage generator coupled to an external power source through a first pin, for generating internal bias voltages used for the integrated circuit; a zero crossing detector coupled magnetically to the inductor through a second pin, for detecting a time at which a voltage across the inductor is zero to provide a zero crossing detection signal; an oscillator reset by the zero crossing detection signal for generating a pulse signal; a flip-flop for generating a first control signal in response to the zero crossing detection signal or the pulse signal; a switching element responsive to the first control signal for enabling a boosted voltage to be provided to the load; an over-current detector for generating an over-current signal when a current flowing through the switching element is over a predetermined value; and a voltage variation detector for detecting variation of a load voltage to generate a variation detection signal and generating a second control signal enabling the boosted voltage to flow through the switching element to a ground in response to both the variation detection signal and the over-current signal. With the integrated circuit, the number of the IC pin and the number of the peripheral components thereof may be considerably reduced.

19 Claims, 4 Drawing Sheets

SIMPLIFIED ACTIVE POWER FACTOR CORRECTION CONTROLLER IC

FIELD OF THE INVENTION

The present invention relates to a semiconductor integrated circuit for a boost converter. More particularly, this invention relates to a semiconductor integrated circuit for correcting an active power factor of a boost converter.

BACKGROUND OF THE INVENTION

Most of the electrical or electronic equipment driven by an alternating current (AC) source do not use the AC source directly, but use direct current (DC) transformed from the AC by means of a rectifier. As is generally well-known, the rectifier comprises several diodes for rectifying AC into DC, and a capacitor for smoothing the DC rectified by the diodes. The smoothing capacitor usually has a large capacitance to maintain the ripple voltage superimposed on the DC under a predetermined level. This results in degradation of the input power factor of the electrical or electronic equipment.

The common methods for improving the input power factor of a rectifier are either passive or active power factor correction. The passive method improves the power factor by inserting an inductor into the rectifier and adjusting the capacitance of the smoothing capacitor and the inductance of the inductor. The active method improves the power factor by controlling the input current by means of a power factor correction integrated circuit (hereinafter, referred to as "IC").

FIG. 1 shows a prior art switch controlling integrated circuit 100 used in a boost converter 10. In FIG. 1, AC power source 21 is coupled to bridge rectifier 22 of boost converter 10. Boost converter 10 also includes a capacitor 23 for smoothing the output of the bridge rectifier 22, a boost inductor 24, a capacitor 27 connected in parallel with a load circuit 7, a switch 30 for controlling the current of the inductor 24, and the switch controller 100.

Referring again to FIG. 1, UVLO (Under Voltage Lock Out) circuit 101 is provided to activate IC 100 only when the voltage supplied from AC power source 21 exceeds a predetermined driving voltage. Comparator 102 detects that the input current from AC power source 21 is zero and comparator 103 compares the input current with a predetermined allowable current magnitude. Also provided is RS flip-flop 104 whose set terminal is coupled to the output of comparator 102. The input of gate driver 105 is coupled to output Q of flip-flop 104. Error amplifier 106 is provided to amplify the difference between the output voltage and a predetermined reference voltage Vref. The inverting terminal of operational amplifier 107 is coupled to the output of error amplifier 106. Reference current source 108 is coupled to the noninverting terminal of operational amplifier 107. Further provided is npn transistor 109 whose collector is connected between reference current source 108 and the noninverting terminal of operational amplifier 107, the emitter is coupled to a ground, and the base is coupled to the complement output of flip-flop 104. And provided is the OR gate 110 whose one input is coupled to the output of the comparator 103, the other input is coupled to the output of the operational amplifier 107, and the output is coupled to the reset terminal of the flip-flop 104.

The switch control IC 100 described above has 8 pins, and the configuration of boost converter 10 using this switch controlling IC requires many peripheral components, such as switching element 30, integrator 33, and resistors 28, 29, 31, and 32, etc.

FIG. 2 shows another prior art switch controlling IC 200 in boost converter 20. FIG. 2 also shows AC power source 41 and bridge rectifier 42. Boost converter 20 shown in FIG. 2 is similar to boost converter 10 shown in FIG. 1.

In the configuration of switch controlling IC 200, comparator 202 is provided to compare the inductor current with a predetermined reference current. Self-starting circuit 203 starts itself at power up. Comparator 202 compares the voltage across boost inductor 44 with a predetermined reference voltage Vref1. Error amplifier 206 amplifies the difference between the output voltage across load 46 (hereinafter, referred to as the "load voltage") and a predetermined reference voltage Vref2 to output an amplified signal. Multiplier 208 is provided to multiply the voltage of capacitor 61 and the amplified signal output from error amplifier 206. Comparator 209 resets flip-flop 204 when the output voltage of multiplier 208 exceeds the voltage of capacitor 55. Switch controlling IC 200 also has 8 pins.

As shown in FIG. 2, when switch controlling IC 200 is used in boost converter 20, many peripheral components such as switching element 51, capacitors 55 and 61, as well as several resistors, etc., must be utilized with the IC 200 in order to implement boost converter 20. This results in difficulty in fabricating a compact circuit and increases the cost of boost converter 20.

SUMMARY OF THE INVENTION

It is, therefore, an object of the present invention to provide an active power factor correction integrated circuit in which a switch controlling IC and a switching element are included to reduce the number of the required peripheral components.

It is another object of the present invention to provide an active power factor correction integrated circuit in which the number of pins to be connected to peripheral components is reduced.

According to an embodiment of the present invention, an active power factor correction integrated circuit is provided to correct a power factor of a boost converter having a rectifier for transforming AC into DC and an inductor connected between the rectifier and a load. The active power factor correction IC comprises a bias voltage generator coupled to an external power source through a first pin that generates internal bias voltages used for the integrated circuit; a zero crossing detector coupled magnetically to the inductor through a second pin for detecting when a voltage across the inductor is zero in order to provide a zero crossing detection signal; an oscillator, reset by the zero crossing detection signal, for generating a pulse signal; means for generating a first control signal in response to the zero crossing detection signal or the pulse signal; means responsive to the first control signal for enabling a boosted voltage to be provided to the load, the means having a switching element; means for generating an over-current signal when a current flowing through the switching element is over a predetermined value; and means for detecting variation of a load voltage to generate a variation detection signal and generating a second control signal enabling the boosted voltage to flow through the switching element to a ground in response to both the variation detection signal and the over current-signal.

According to the active power factor correction IC, the number of pins thereof and the number of the peripheral components thereof may be considerably reduced.

Further features and advantages of the present invention will become apparent from the accompanying drawings and detailed description.

DETAILED DESCRIPTION OF THE INVENTION

Figure 1:
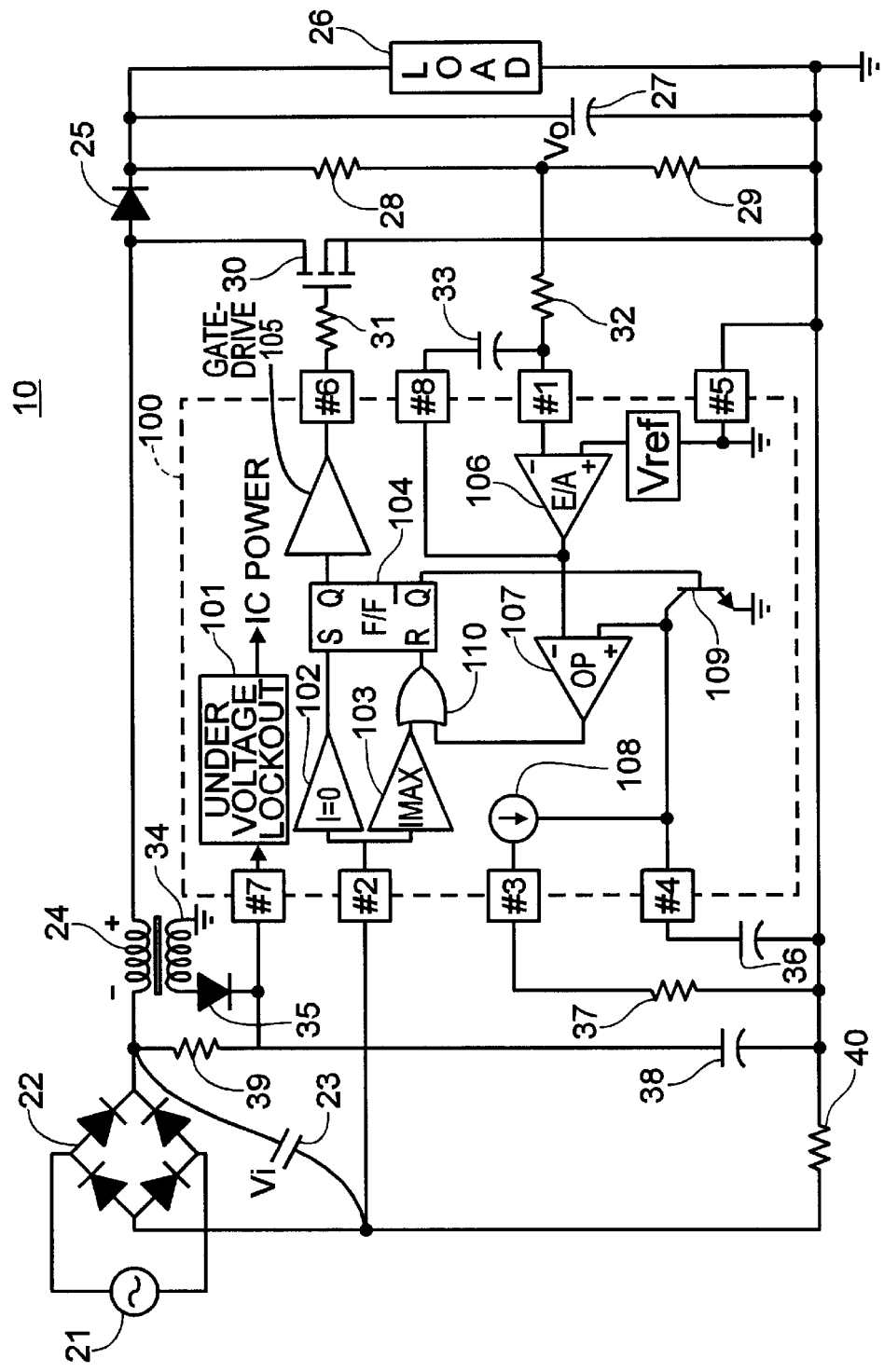
FIG. 1 illustrates a prior art switch controlling integrated circuit in a boost converter.
Figure 2:
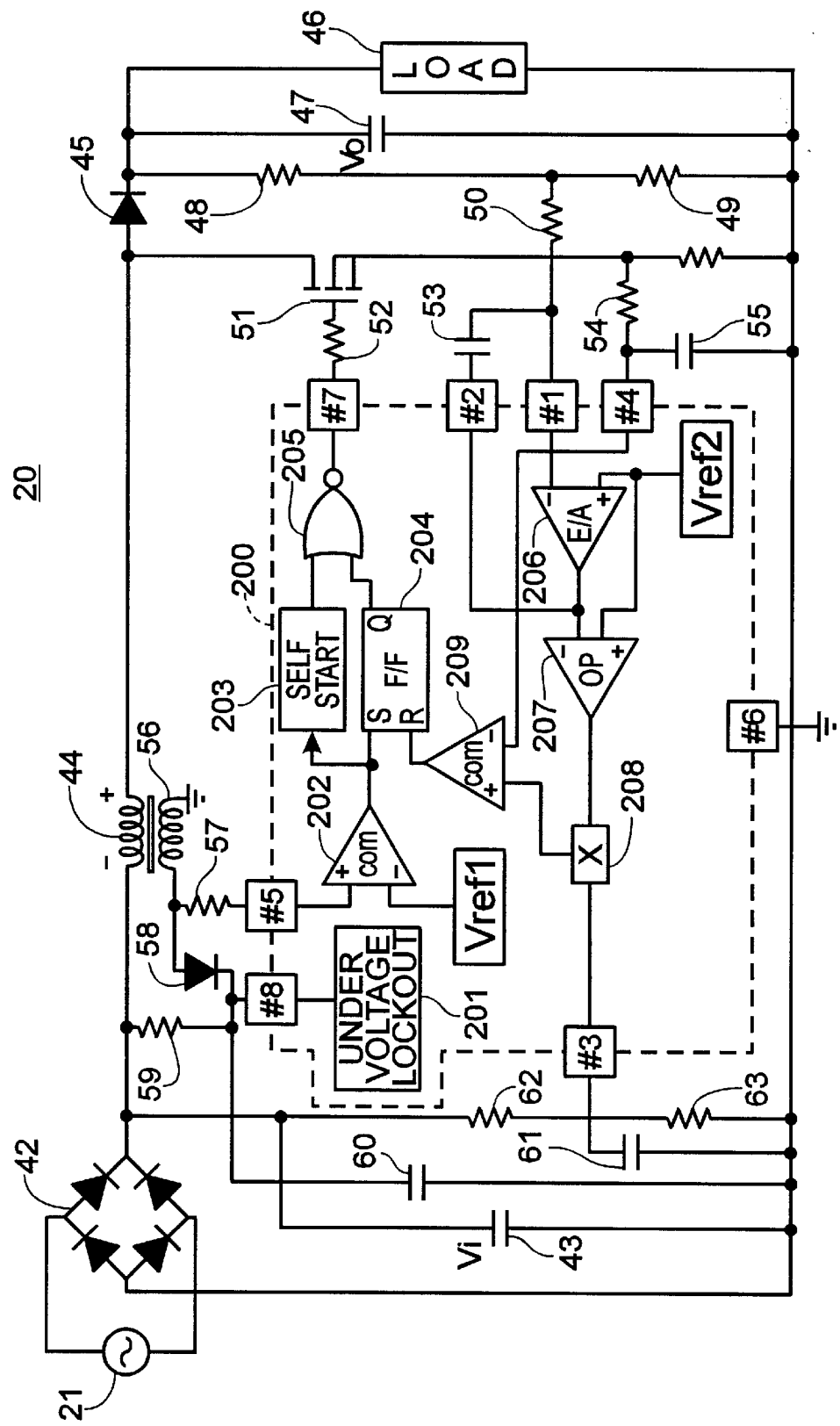
FIG. 2 illustrates another prior art switch controlling integrated circuit in a boost converter.
Figure 3:
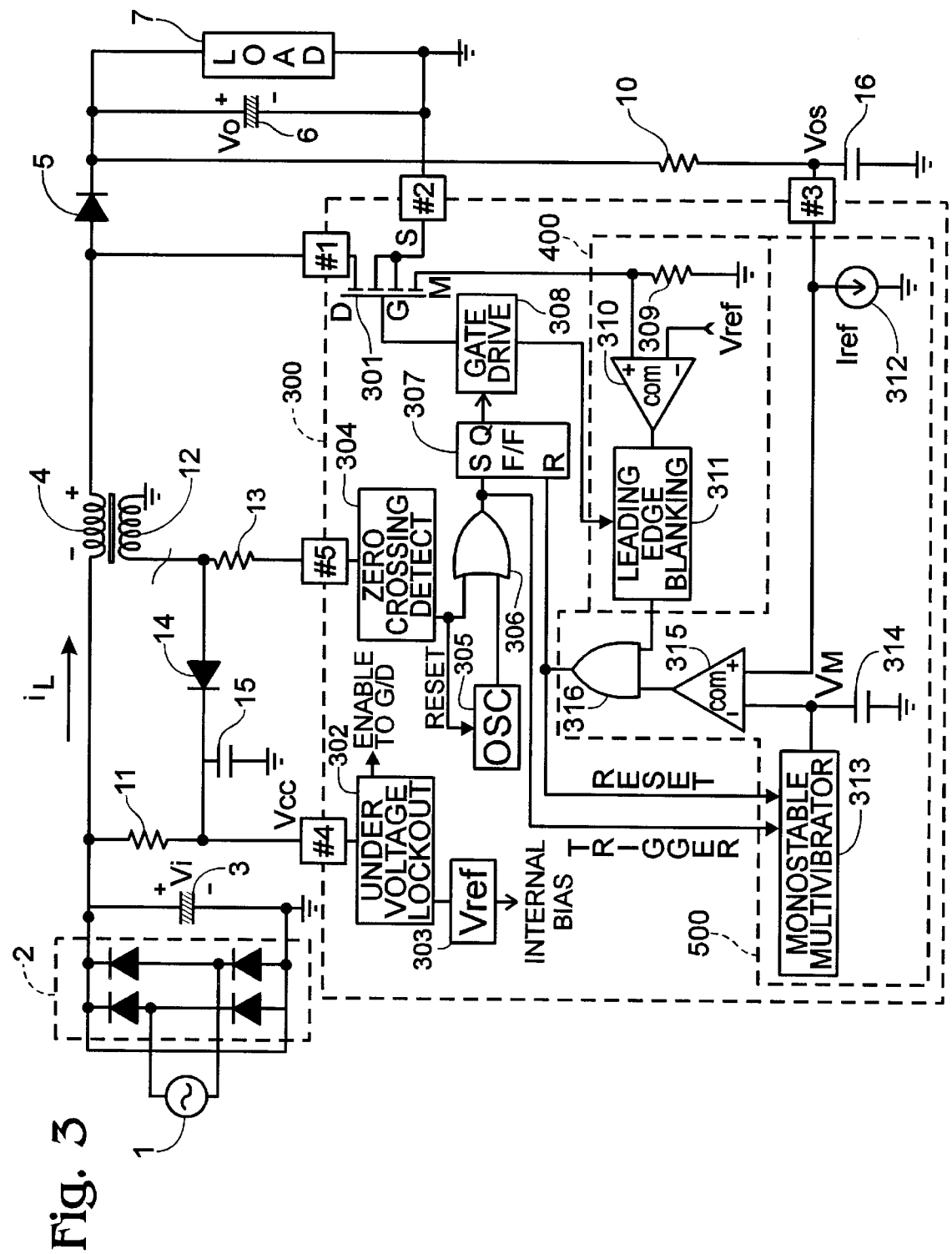
FIG. 3 illustrates an embodiment of a power factor correction integrated circuit for a boost converter according to the present invention.

FIG. 3 illustrates a power factor correction integrated circuit 300 for a boost converter 600 in accordance with an embodiment of the present invention. Power factor correction IC 300 includes a switching element and a switch controlling circuit.

Referring to FIG. 3, boost converter 600 further comprises a bridge rectifier 2 for transforming AC power supplied from an external source 1 into DC power, smoothing capacitor 3, boost inductor 4, diode 5 whose anode terminal is coupled to boost inductor 4, capacitor 6 having one terminal coupled between the cathode of the diode 5 and the load 7 and the other terminal coupled to a ground. Power factor correction IC 300 has 5 pins labelled #1 through #5. Pin #1 is connected between inductor (hereinafter, referred to as "first inductor") 4 and the anode of the diode 5. The pin #2 is coupled to the ground. The pin #3 is coupled to the cathode of diode 5 through resistor 10. Pin #4 is coupled through resistor 11 to the output of rectifier 2, and pin #5 is coupled through resistor 13 to a terminal of inductor (hereinafter, referred to as "second inductor") 12 wherein the other terminal of inductor 12 is coupled to the ground and which makes a mutual inductance coupling with the first inductor 4. The other terminal of the second inductor 12 is coupled to the anode of diode 14. Diode 14 is provided to half-wave rectify the voltage induced in second inductor 12. The cathode of the diode 14 is coupled to pin #4. The cathode of diode 14 is also coupled to smoothing capacitor 15, and pin #3 is coupled to capacitor 16. Capacitor 16 is provided to monitor the output voltage Vo and integrate the variation of the output voltage, and is hereinafter referred to as a sense capacitor.

The power factor correction IC 300 includes switching transistor 301 for switching the current flowing toward load 7. This switching transistor 301 is preferably an n-channel MOSFET which has two general source terminals and a mirror terminal. The drain of switching FET 301 is coupled to the anode of diode 5 which is externally coupled to power factor correction IC 300 through pin #1, the two source terminals of switching are commonly coupled to the ground through pin #2, and the mirror terminal is coupled to the ground through resistor 309. When switching FET 301 is in a bias state, the magnitude of the current flowing through mirror terminal of switching FET 301 is proportional to the magnitude of the current flowing through the source terminals. Hereinafter, the current signals flowing through the mirror terminal, the sources, the drain, and the gate of switching FET 301 are referred to as the mirror current, the source current, the drain current and the gate current, respectively. The magnitude of the mirror current is much less than that of the source current by a predetermined current ratio. Accordingly, it is possible to detect the value of the drain current by a resistor with a small resistance in IC 300. Also, the active power factor correction IC 300 also includes an UVLO circuit 302 which receives, through pin #4, voltage Vcc supplied through driving resistor 11 from rectifier 2, bias circuit 303 for biasing the active components of IC 300, zero crossing detector 304 for detecting the point in time at which the current induced in second inductor 12 is zero, oscillator 305 for generating a pulse signal having a fixed frequency, OR gate 306 whose two inputs are coupled to the output of zero crossing detector 304 and the output of oscillator 305 respectively, RS flip-flop 307 whose set terminal is coupled to the output of OR gate 306, gate driver 308 whose output is coupled to the gate of switching transistor 301 and which turns switching transistor 301 on and off according to the output Q of flip-flop 307, resistor 309 for transforming the mirror current into a voltage (hereinafter, referred to as "mirror voltage") proportional to the mirror current, comparator (hereinafter, referred to as "first comparator") 310 for comparing the mirror voltage to a predetermined reference voltage Vref, leading edge blanking circuit 311 for removing a pulse type of noise which is generated when switching transistor 301 is operated, reference current source 312, monostable multivibrator 313 triggered by the output of OR gate 306, capacitor (hereinafter, referred to as "integrator") 314 connected between the output of monostable multivibrator 313, and ground for integrating the output current of monostable multivibrator 313, comparator (hereinafter, referred to as "second comparator") 315 for comparing the voltage $V_M$ of the integrator 314 with the voltage $V_{OS}$ of the sense capacitor 16, an AND gate whose two inputs are coupled to the output of the leading edge blanking circuit 311 and the output of the second comparator 315 respectively and whose output is coupled to both the reset terminal of the flip-flop 307 and the reset terminal of the multivibrator 313.

Referring again to FIG. 3, reference numeral 400 indicates an over-current detector circuit and reference numeral 500 indicates an output change detector circuit. The over-current detector 400 comprises a resistor 309, a comparator 310 and a lead edge blanking circuit 311. The over-current detector 400 generates a logical high level output signal when the voltage signal of the resistor 309 is greater than predetermined reference voltage Vref. The output change detector 500 comprises a monostable multivibrator 313, a capacitor 314, a comparator 315, and a reference current source 312. The reference current source is coupled through pin #3 to the load 7 of the boost converter through an external sense resistor 10 and to the ground through external sense capacitor 16.

Next, the operation of the above preferred embodiment of the present invention will be described.

When the voltage Vcc is applied to this active power factor correction IC 300 through the driving resistor 11, the UVLO circuit 302 in the IC 300 enables the IC to operate only when the voltage Vcc exceeds a predetermined driving voltage. This UVLO circuit 302 functions as a low voltage protection circuit. That is, the UVLO circuit 302 minimizes the power consumption of the IC 300 when the voltage Vcc is under the predetermined driving voltage. Also, when the voltage Vcc is over the predetermined voltage, the UVLO circuit allows the gate drive 308 to be enabled. If the voltage Vcc is supplied to the UVLO circuit 302, the bias circuit 303 generates internal bias voltages and supplies them to each component of the IC 300. The zero crossing detector 304 is provided to detect the time when a current value of the first inductor 4 is at zero. At this time, the zero cross detector 304 outputs a high level logic signal.

Figure 4:
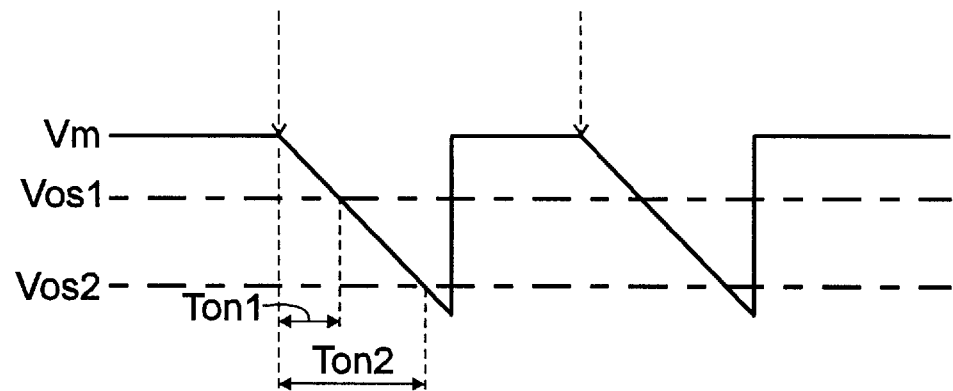
FIG. 4 is an ON/OFF timing diagram of a switching transistor in accordance with the output of a monostable multivibrator and two output voltages from an embodiment of a boost converter according to the present invention.

The oscillator 305 generates a pulse signal of a fixed period and is self-starting at the initial operation or after an abnormal event. During a normal operation, the oscillator 305 is reset by the zero crossing detector 304 so that the oscillator 305 operates in synchronization with the output of the detector 304. The output signals of the zero crossing detector 304 and the oscillator are applied to the inputs of the OR gate 306. The output of the OR gate 306 is supplied to the set terminal of the RS flip-flop 307 and the trigger terminal of the monostable multivibrator 313. The waveform of the output of the multivibrator 313 triggered by the zero crossing detector 304 is shown in FIG. 4. On the other hand, when the output of the OR gate 306 is a logical high level signal, the flip-flop 307 outputs a high level logic signal such that the gate driver 308 drives the switching transistor 301 on. At this time, the voltage $V_{Li}$ of the first inductor 4 is −Vi. If the switching transistor 301 is turned on, the voltage induced by the second inductor 12 is half-wave rectified by a diode 14 and smoothed by a capacitor 15 such that the resultant voltage serves as the voltage Vcc of the IC 300.

The load regulation is carried out by a sense resistor 10, a sense capacitor 16, a reference current source 312, a multivibrator 313, an integrator 314, and a second comparator 315. As shown in FIG. 3, the sense resistor 10 and the sense capacitor 16 are peripheral components for the IC 300. The capacitance of the sense capacitor 16 is large enough for the sense capacitor 16 to both detect the output voltage Vo and integrate the change in the output voltage at the same time. The value of the current Iref of the reference current source 312 is set equal to the value of the current flowing through the sense resistor 10 (hereinafter, referred to as "sense current") during a normal operation. At this time, the sense capacitor 16 has a constant sense voltage Vos. During an abnormal operation, that is, if the sense current exceeds the reference current, a part of the sense current flows through the reference current source 312 and the rest is accumulated in the sense capacitor 16. Accordingly, the sense voltage Vos is then increased.

On the other hand, if the sense current is less than the reference current Iref, the current from the sense capacitor 16 flows to the ground through the reference current source 312 such that the sense voltage $V_{os}$ is reduced. Therefore, the sense capacitor 16 performs both detecting of the output Vo and integrating of the change of the output Vo.

The first comparator 310 detects when the drain current of the switching transistor 301 is over a predetermined current. If the drain current exceeds the predetermined current, the first comparator 310 generates a high level logic signal at its output. The output of the first comparator 310 is supplied to the leading edge blanking circuit 311. The lead edge blanking circuit 311 then removes the noise present at the output of the first comparator 310. The second comparator 315 compares the sense voltage Vos with the output voltage $V_M$ from the capacitor 314 and generates a high level logic signal when the sense voltage Vos is over the voltage $V_M$. When the outputs of the first and the second comparators 310 and 315 are both at high level, the flip-flop 307 and the multivibrator 313 are simultaneously reset by the output of the AND gate 316. As a consequence, the flip-flop 307 supplies an output signal of low level to the gate driver 308. Therefore, the switching transistor 301 is turned off by the gate driver 308. The current accumulated at the first inductor 4 then flows through the diode 5 such that the voltage across the first inductor becomes Vo−Vi.

Figure 5:
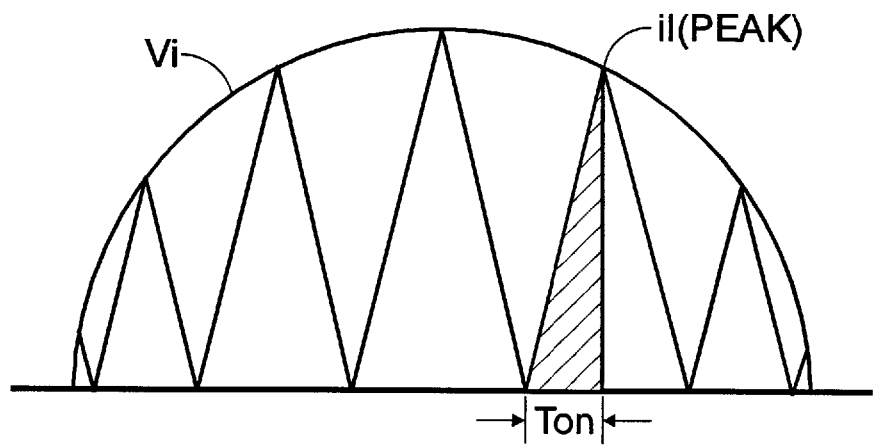
FIG. 5 is a diagram showing waveforms of the input voltage an inductor current of the embodiment of a booster converter according to the present invention as shown in FIG. 3.

FIG. 4 shows the ON/OFF timing of the switching transistor 301 in accordance with the output $V_M$ of a monostable multivibrator 313 and two output voltages from the boost converter. In FIG. 4, Vos1 indicates the output detection voltage of the sense capacitor 16 during a normal operation and Ton[1] indicates the normal turn-on interval. Vos2, on the other hand, indicates the output detection voltage of the sense capacitor 16 when the load is increased such that the output voltage Vo decreases. In the case where the load is increased such that the output voltage Vo decreases, the turn-on interval Ton[2] of the switching transistor 301 is longer than when the transistor 301 is in a normal operation state. FIG. 5 shows the waveforms of the input voltage Vi and the inductor current $i_L$ shown in FIG. 3.

In the above described power factor correction integrated circuit 300 of the present invention, when the turn-on period of the switching transistor 301 during the interval of one cycle of the input voltage is maintained at a constant, the peak value $i_{L(peak)}$ of the inductor current follows the waveform of the input voltage Vi. In other words, from the equation $V_{Li}=di_L/dt$, the following is obtained: $i_{L(peak)}=(V_{Li}/Li)T_{on}$. If the turn-on period of the switching transistor 301 is constant, the peak value $i_{L(peak)}$ of the inductor becomes proportional to $V_{Li}$(=Vi). As is described above, the active power factor correction IC according to the present invention is constructed by packaging a switching means and a control means together. As a consequence, the number of the IC pins is considerably reduced. Also, the number of the peripheral components in the present invention is considerably reduced such that it is easy to configure the power factor correction circuit for a given boost converter.

While the invention has been particularly shown and described with reference to the preferred embodiment thereof, it will be understood that various changes in form and details may be made therein without departing from the spirit and scope of the invention.

What is claimed is:

1. An active power factor correction integrated circuit for correcting a power factor of a boost converter having a rectifier for transforming AC into DC and an inductor coupled between the rectifier and a load, the integrated circuit comprising:

a bias voltage generator configured to be coupled to an external power source through a first pin, wherein the generator is further configured to generate internal bias voltages used within the integrated circuit;

a zero crossing detector configured to be coupled magnetically to the inductor through a second pin, wherein the zero crossing detector is further configured to detect a time at which a voltage across the inductor is zero and generate a zero crossing detection signal responsive thereto;

an oscillator configured to be reset by the zero crossing detection signal wherein the oscillator is further configured to generate a pulse signal;

means for generating a first control signal in response to one of the zero crossing detection signal and the pulse signal;

switching means responsive to the first control signal configured to be coupled to the load through third and fourth pins and further configured for enabling a boosted voltage to be provided to the load;

means for generating an over-current signal when a current flowing through the switching means is over a predetermined value; and means for detecting variation of a load voltage configured to be coupled to the load through a fifth pin wherein the means for detecting is further configured to generate a variation detection signal responsive to a sense voltage present at the fifth pin and is still further configured to generate a second control signal enabling the boosted voltage to flow through the switching element to a ground in response to both the variation detection signal and the over current-signal.

2. The integrated circuit of claim 1, wherein said switching element is a MOSFET having a drain that is coupled between the inductor and the load through the third pin, a gate configured to receive the first control signal, at least one source terminal coupled to the load through the fourth pin, and a mirror terminal coupled to the means for generating an over-current signal, and wherein a mirror current flowing through the mirror terminal is proportional to a current flowing through the drain.

3. The integrated circuit of claim 2, wherein the means for generating an over-current signal comprises:

a resistor coupled between the mirror terminal and the ground, thereby changing the mirror current signal into a corresponding voltage signal; and a first comparator having a first input terminal coupled to the current mirror terminal so as to receive the corresponding voltage signal, a second input terminal coupled a reference voltage signal, and an output terminal at which the over-current signal is produced.

4. The integrated circuit of claim 3, further comprising means for eliminating noise contained in the mirror current occurring upon the switching element being initially activated.

5. The integrated circuit of claim 1, further comprising means for enabling the integrated circuit to be operated only when a power source voltage from the rectifier is at least equal to a predetermined voltage required for driving the integrated circuit.

6. The integrated circuit of claim 1, wherein said first control signal generating means further comprises a driver for turning on/off the switching means in response to the first control signal.

7. The integrated circuit of claim 1, wherein said means for detecting variation of a load voltage further comprises:

a monostable multivibrator which is triggered by at least one of the zero crossing detection signal and the pulse signal and reset by the second control signal;

an integrator for integrating an output current of the monostable multivibrator in order to generate a corresponding voltage signal; and a comparator which compares the variation detection signal with the voltage signal from the integrator in order to generate a comparison result thereof as the second control signal.

8. The integrated circuit of claim 7, further comprising a reference current source for generating a constant current which thereby generates the variation detection signal.

9. The integrated circuit of claim 8, wherein the fifth pin is further configured to be coupled to the load through an external resistor, to which the load voltage is applied, and wherein the fifth pin is still further configured to be coupled to the ground through an external capacitor 16 such that the variation detection signal appears at the fifth pin.

10. An active power factor correction integrated circuit configured for use in a boost converter, wherein the boost converter has first and second input terminals for coupling to a power source, first and second output terminals for coupling to a load, a sense resistor and sense capacitor coupled in series between the first and second output terminals, and an inductor wherein the boost converter is further configured to convert AC received from the power source into DC supplied to the load at the first and second output terminals, the integrated circuit comprising:

a first pin configured to be coupled to the first output terminal;

a second pin configured to be coupled to the second output terminal;

a third pin configured to be coupled to the inductor;

a fourth pin configured to be coupled to the first output terminal through a sense resistor and wherein the fourth pin is further configured to be coupled to the second output terminal through the sense capacitor such that a sense voltage is present at the fourth pin;

a zero crossing detector magnetically coupled to the inductor through the third pin, wherein the zero crossing detector is configured to detect a time at which a current through the inductor is zero and, responsive thereto, to generate a zero crossing detection signal;

an oscillator configured to be reset by the zero crossing detection signal, wherein the oscillator is further configured to generate a pulse signal;

a switching element coupled between the first and second pins having a first power terminal coupled to the first pin, a second power terminal coupled to the second pin, a control terminal configured to control a first current between the first and second power terminals, and a mirror terminal configured to generate a mirror current signal responsive to the first current that is proportional to the first current;

an over-current detection circuit configured to receive the mirror current signal wherein the over-current detection circuit is further configured to generate an over-current signal when the first current is greater than a predetermined level;

an output change detector circuit coupled to the fourth pin in order to receive the sense voltage, wherein the output change detector circuit is further configured to receive the over-current signal, and wherein the output change detector circuit includes a monostable multivibrator and an integrator capacitor wherein the integrator capacitor is coupled between an output of the monostable multivibrator and the second pin, and further wherein the output change detector circuit is still further configured to compare a voltage at the output of the multivibrator with the sense voltage and logically combine a result of the comparison with the over-current signal in order to generate a current control signal; and a switch element drive circuit coupled to the gate terminal of the switch element and configured to receive the current control signal and the pulse signal, wherein the switch element drive circuit controls the first current in response to the current control signal and pulse signal such that the switch element is turned on to cause the first current to flow in response to the zero crossing detection signal and the first current is halted from flowing in response to the current control signal.

11. The integrated circuit of claim 10, wherein said switching element is a MOSFET having gate, source, drain and minor terminals, wherein the drain terminal corresponds to the first power terminal, the source terminal corresponds to the second power terminal, the gate terminal of the MOSFET corresponds to the gate terminal of the switching element and the mirror terminal of the MOSFET corresponds to the mirror terminal of the switching element.

12. The integrated circuit of claim 11, wherein the over-Current detection circuit further comprises:

a comparator having first and second input terminals and an output terminal, wherein the first terminal is coupled to the mirror terminal of the switching element, and further wherein the second terminal is configured to receive a predetermined reference voltage that corresponds to the predetermined level of the first current; and a resistor coupled between the mirror terminal of the switching element and the second pin, such that the mirror current signal is transformed into a corresponding voltage signal; and wherein the comparator compares the corresponding voltage signal and the predetermined reference voltage signal and, responsive thereto, generates the over-current signal at the output terminal of the comparator.

13. The integrated circuit of claim 12, wherein the over-current detection circuit further includes a leading edge blanking circuit having first and second input terminals and an output terminal, wherein the first input terminal is coupled to the output terminal of the comparator, and further wherein the second input terminal is coupled to the gate terminal of the switching element whereby the leading edge blanking circuit reduces a level of a noise signal generated when the switching element is activated in the over-current signal as it appeals at the output of the leading edge blanking circuit.

14. The integrated circuit of claim 10, further comprising:

a fifth pin configured to be coupled to the power source; and an under voltage lock-out circuit that inhibits operation of the integrated circuit when a power source voltage from the power source is less than a predetermined voltage.

15. The integrated circuit of claim 10, wherein said switch-element drive circuit further comprises:

a driver having input and output terminals, wherein the output terminal is coupled to the gate terminal of the switching element;

a flip-flop having set, reset and output terminals, wherein the output terminal is coupled to the input of the driver, and further wherein the reset terminal receives the current control signal; and a logical OR gate having first and second input terminals and an output terminal, wherein the output terminal is coupled to the set terminal of the flip-flop, and further wherein the first input terminal receives the zero crossing detection signal, and still further wherein the second input terminal receives the pulse signal.

16. The integrated circuit of claim 10, wherein the monostable multivibrator includes trigger, reset and output terminals, wherein the trigger terminal is configured to receive the zero crossing detection signal and the pulse signal such that the monostable multivibrator is triggered by both the zero crossing detection signal and the pulse signal, and further wherein the reset terminal of the monostable multivibrator receives the current control signal, and still further wherein the integrator capacitor is coupled between the output terminal of the monostable multivibrator and the second pin such that the integrator capacitor integrates an output current of the monostable multivibrator; and wherein the output chance detector circuit further includes:

a comparator having first and second input terminals and an output terminal, wherein the first input terminal is coupled to the output terminal of the monostable multivibrator, and further wherein the second input terminal is coupled to the fourth pin;

a current reference coupled between the second input terminal of the comparator and the fourth pin, wherein the current reference is configured to conduct a constant predetermined current; and a logical AND gate having first and second input terminals and an output terminal, wherein the first input terminal is coupled to the output of the comparator, and further wherein the second input terminal receives the over-current signal and still further wherein the current control signal is generated at the output terminal of the AND gate.

17. A method for active power factor correction in a boost converter using an integrated circuit, wherein the boost converter is configured to convert AC received from a power source into DC supplied to a load, the method comprising the steps:

generating a zero crossing signal when a current in an inductor coupled between the power source and the load has no magnitude;

generating a pulse signal by using the zero crossing signal to reset an oscillator;

generating a shunt current in a first current path parallel to the load;

generating a mirror voltage that is proportional to a magnitude of the shunt current;

generating an over-current signal when the mirror current is above a predetermined threshold;

triggering a monostable multivibrator responsive to both the zero crossing detection signal and the pulse signal;

integrating an output current of the monostable multivibrator to produce a multivibrator output signal;

obtaining a sense voltage from a circuit node interposed a sense resistor and sense capacitor, wherein the sense resistor and sense capacitor are connected in series with one another in a second current path parallel to the load;

comparing the sense voltage with the multivibrator output signal to produce a first current control signal;

comparing the mirror voltage with a predetermined reference voltage to produce an over-current signal;

combining the first current control signal and the over-current signal to produce a second current control signal;

resetting the monostable multivibrator using the second current control signal;

starting the flow of the shunt current responsive to the zero crossing detection signal; and halting the flow of the shunt current responsive to the second current control signal.

18. The method of claim 17, further including the step of reducing a noise signal present in the over-current signal using a leading edge blanking circuit.

19. The method of claim 18, further including the step of connecting a current reference in parallel to the sense capacitor.

* * * * *

UNITED STATES PATENT AND TRADEMARK OFFICE
CERTIFICATE OF CORRECTION

PATENT NO.   : 5,818,707
DATED        : October 6, 1998
INVENTOR(S)  : Hwan-Ho Seong et al.

It is certified that error appears in the above-identified patent and that said Letters Patent is hereby corrected as shown below:

Column 7,
Line 27, "coupled a reference" should read -- coupled to a reference --.

Column 8,
Line 65, "minor terminals" should read -- mirror terminals --.

Column 9,
Line 67, "chance detector" should read -- change detector --.

Signed and Sealed this

Seventeenth Day of September, 2002

*Attest:*

*Attesting Officer*

JAMES E. ROGAN
*Director of the United States Patent and Trademark Office*